United States Patent [19]

Blasing

[11] Patent Number: 5,876,011

[45] Date of Patent: Mar. 2, 1999

[54] UTILITY STAND HAVING THREADED ADJUSTING APPARATUS

[76] Inventor: William J. Blasing, 6527 Jefferson St., Kansas City, Mo. 64113

[21] Appl. No.: 851,356

[22] Filed: May 5, 1997

[51] Int. Cl.$^6$ ................................................ F16M 11/00
[52] U.S. Cl. ................... 248/411; 248/170; 403/109.1; 403/377
[58] Field of Search .................... 248/411, 170, 248/158, 161, 407, 413, 157, 188.6, 125.8, 354.3, 354.4; 403/109, 104, 110, 377

[56] References Cited

U.S. PATENT DOCUMENTS

| | | | |
|---|---|---|---|
| 222,972 | 12/1879 | White | 248/161 |
| D. 353,912 | 12/1994 | Shiao | D26/140 |
| 556,770 | 3/1896 | Powers | 248/163.1 |
| 680,231 | 8/1901 | Deppe | 248/125.8 |
| 2,473,218 | 7/1949 | Reichenbach | 248/411 |
| 2,532,168 | 11/1950 | Jakoubek | 248/354.3 X |
| 2,646,956 | 7/1953 | Cadwell et al. | 248/170 |
| 3,026,641 | 3/1962 | Keats | 248/156.8 X |
| 3,130,439 | 4/1964 | Bovaird | 248/161 |
| 3,509,334 | 4/1970 | Michailou | 240/81 |
| 4,744,536 | 5/1988 | Bancalari | 248/125.8 |
| 5,082,222 | 1/1992 | Hsu | 248/170 |
| 5,310,145 | 5/1994 | Chen | 248/170 |
| 5,428,520 | 6/1995 | Skief | 362/427 |
| 5,448,464 | 9/1995 | Mass | 362/401 |
| 5,461,551 | 10/1995 | Clayton | 362/183 |

OTHER PUBLICATIONS

Light Stand By Reqent Lighting Corporation (2 Attacted Drawings).

Primary Examiner—Derek J. Berger
Assistant Examiner—Stephen S. Wentsler
Attorney, Agent, or Firm—David L. Volk

[57] ABSTRACT

A telescoping assembly is attached to a base for supporting the assembly above a floor. The assembly includes nestable elongated members having threaded sleeves configured to tighten the members in place in a nested position and in an extended position. A trouble light hook is attached to a distal end of the elongated member which is most distal from the base when the assembly is in a fully extended position.

4 Claims, 4 Drawing Sheets

UTILITY STAND HAVING THREADED ADJUSTING APPARATUS

BACKGROUND OF THE INVENTION

1. Field of the Invention

The present invention relates to stands, particularly to a stand adapted to hang articles there-from.

2. Description of the Related Art

When working with a trouble light, it is often difficult to find a convenient place to mount the light. What is needed is a device which will permit the mounting of a trouble light at various heights and in various locations, as needed.

SUMMARY OF THE INVENTION

The utility stand of the present invention includes a telescoping assembly which is attached to a base for supporting the assembly above a floor. The assembly includes nestable elongated members having threaded sleeves configured to tighten the members in place in a nested position and in an extended position. A trouble light hook is attached to a distal end of the elongated member which is most distal from the base when the assembly is in a fully extended position.

DETAILED DESCRIPTION

Figure 1:
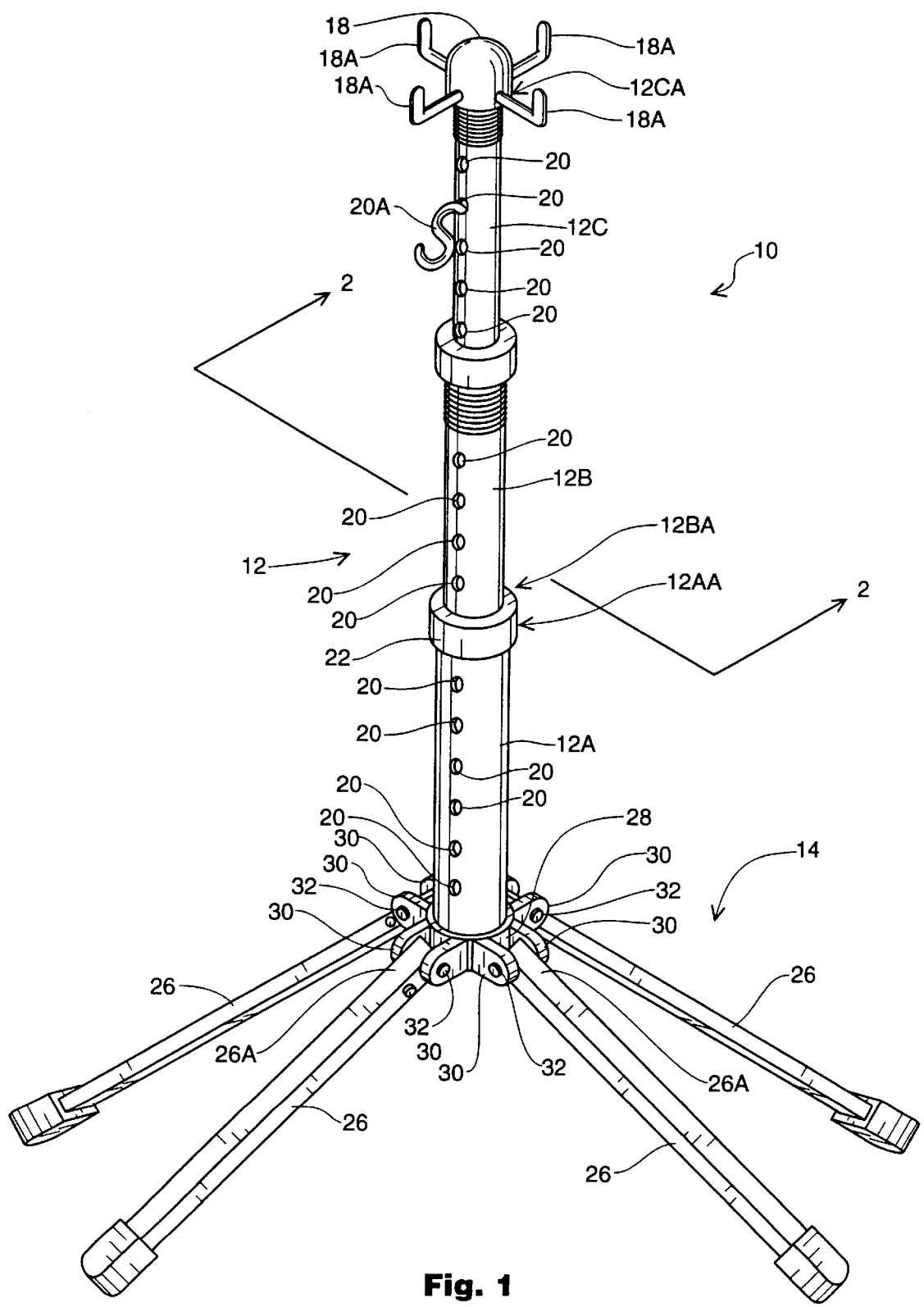
FIG. 1 is a perspective view of a utility stand.

FIG. 1 is a perspective view of a utility stand 10 for mounting a trouble light (not shown) thereon, and for mounting of other accessories and tools as needed. A telescoping assembly 12 is mounted to a base 14 for supporting the assembly 12 above a floor (not shown). The assembly 12 comprises a first elongated member 12A, a second elongated member 12B, and a third elongated member 12C. The first elongated member 12A is attached to the base 14. The second elongated member 12B is nestable within the first elongated member 12A, and the third elongated member 12C is nestable within the second elongated member 12B. A cap 18 has outward extending hooks 18A for attachment of a trouble light thereon. The cap 18 is attached to a distal end 12CA of the third elongated member 12C. The third elongated member 12C is the most distal elongated member from the base 14 when the assembly 12 is fully extended.

In the embodiment shown, each of the elongated members 12A, 12B, 12C includes a plurality of mounting holes 20 there-through. S-hooks 20A may be inserted into the mounting holes 20, and tools or other accessories (not shown) may be hung thereon. It is within the scope of the present invention that the mounting holes 20 may be included on less than all of the elongated members 12A, 12B, 12C.

Figure 2:
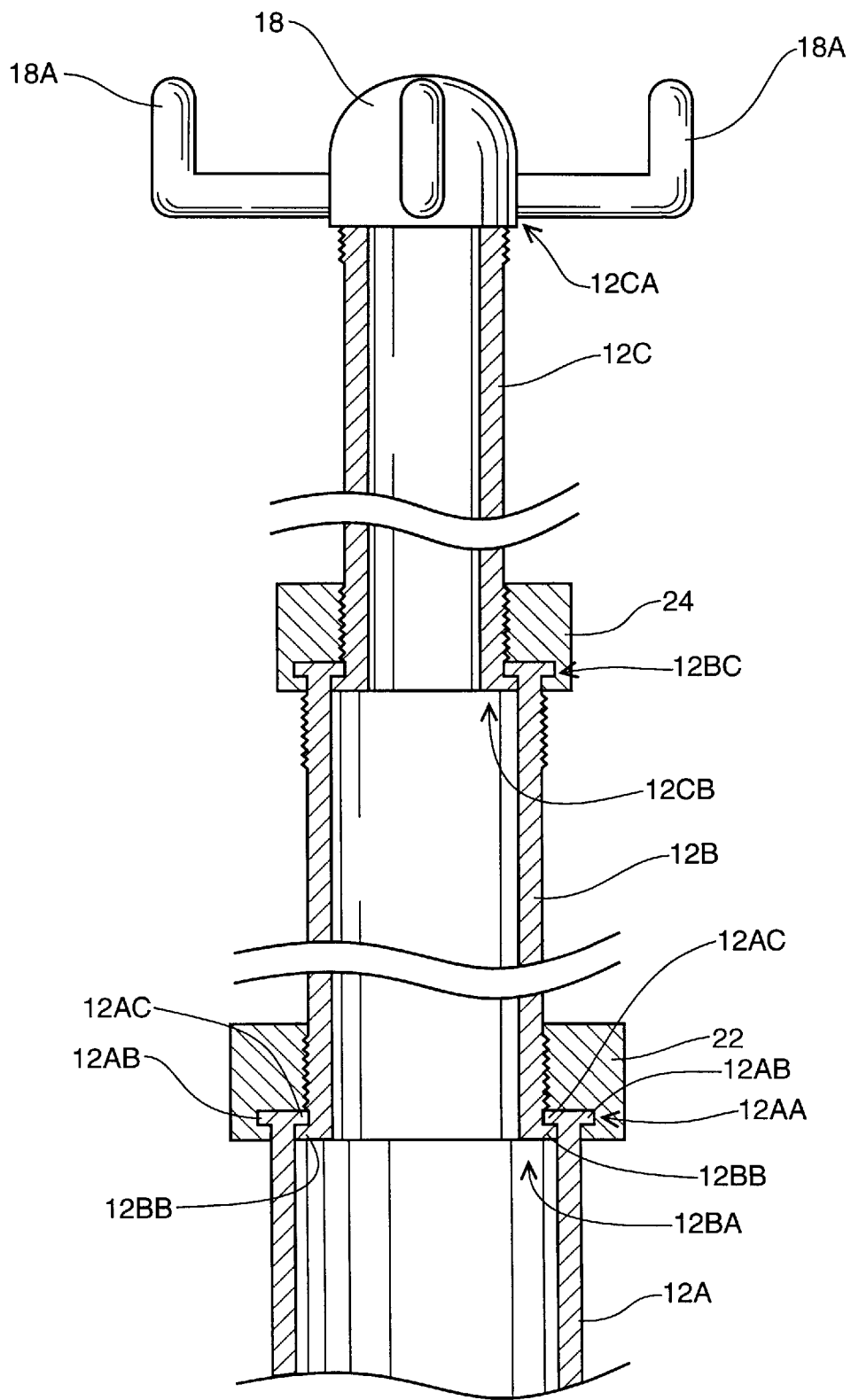
FIG. 2 is a cross-sectional view of the telescoping assembly taken along line 2—2 of FIG. 1.

FIG. 2 is a cross-sectional view of the telescoping assembly 12 taken along line 2—2 of FIG. 1. A first threaded sleeve 22 is rotatably attached to a distal end 12AA of the first elongated member 12A. A first end 12BA of the second elongated member 12B includes an outwardly extended annular lip 12BB. The distal end 12AA of the first elongated member 12A includes a second outwardly extended annular lip 12AB configured to engage the first threaded sleeve 22, and an inwardly extended annular lip 12AC configured to engage the outwardly extended annular lip 12BB to prevent the second elongated member 12B from separating from the first elongated member 12A. The second elongated member 12B is threaded near the first end 12BA and near a second end 12BC to engage the first threaded sleeve 22 at either of the first and second ends 12BA, 12BC.

The third elongated member 12C is threaded near the distal end 12CA of the third elongated member 12C and is threaded near a proximal end 12CB of the third elongated member 12C. A second threaded sleeve 24 is rotatably attached to the second end 12BC of the second elongated member 12B. The second threaded sleeve 24, the second end 12BC of the second elongated member 12B, and the proximal end 12CB of the third elongated member 12C are configured the same as the first threaded sleeve 22, the distal end 12AA of the first elongated member 12A, and the first end 12BA of the second elongated member 12B.

When the assembly 12 is in a fully extended position as shown in FIGS. 1 and 2, the first and the second threaded sleeves 22, 24 are threadedly engaged with the second elongated member 12B and the third elongated member 12C respectively to hold the assembly 12 in the fully extended position.

Referring again to FIG. 1, the base 14 includes a plurality of legs 26 pivotally attached to a central member 28. The central member 28 is attached to the telescoping assembly 12. A plurality of pairs of extending ears 30 are connected to the central member 28. An upper end 26A of each one of the legs 26 is disposed between each pair of ears 30.

Figure 3:
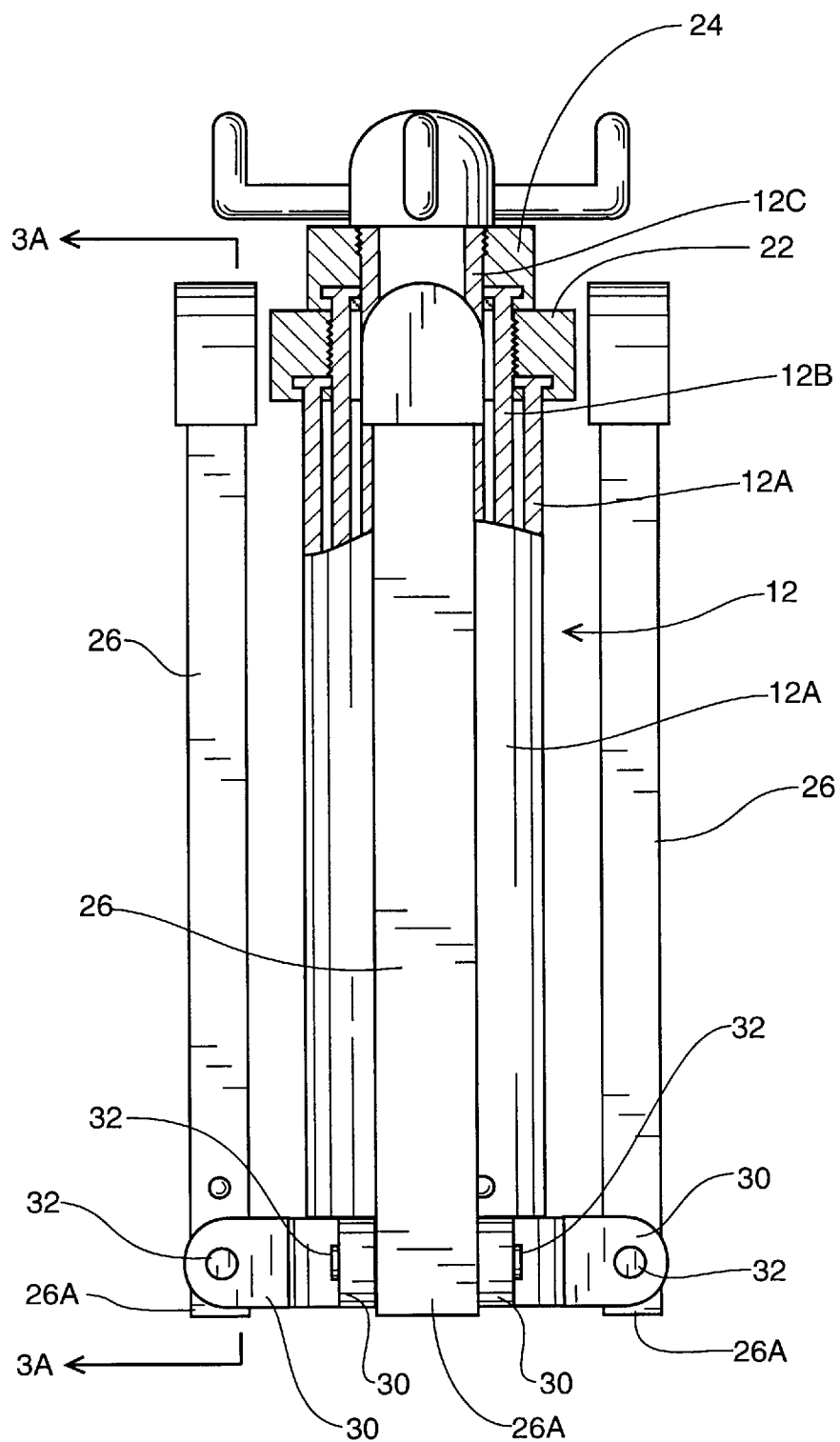
FIG. 3 is a partial elevational/partial cross-sectional view of the utility stand in a fully retracted position with the legs in a folded position.

FIG. 3 is a partial elevational/partial cross-sectional view of the utility stand 10 in a fully retracted position with the legs 26 in a folded position. The legs 26 are lockable in the folded position shown in FIG. 3, and in an unfolded position as shown in FIG. 1.

Figure 3A:
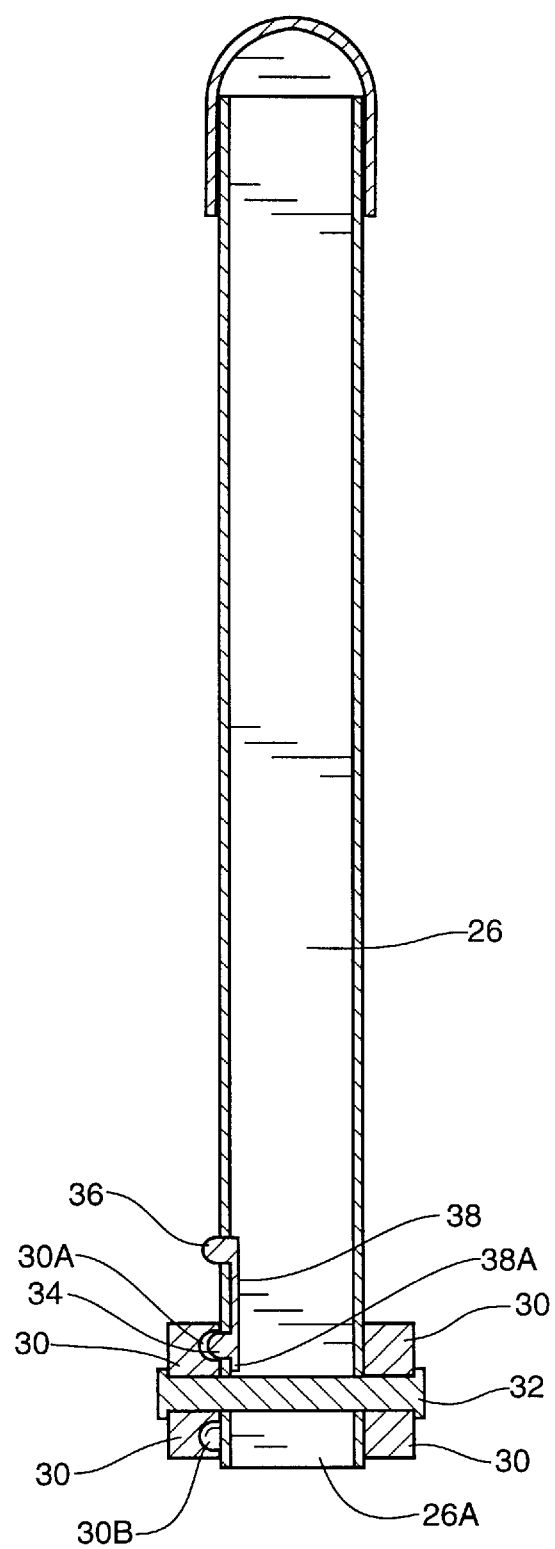
FIG. 3A is a cross-section taken along line 3A—3A of FIG. 3.

FIG. 3A is a cross-section taken along line 3A—3A of FIG. 3. Referring to FIGS. 1, 3 and 3A, a pin 32 extends through each pair of ears 30 and through the leg 26 disposed between the pair of ears 30, thereby pivotally attaching the legs 26 to the central member 28. The upper end 26A of each leg 26 includes a protrusion 34 which is spring-urged outward and which is configured to be manually pressed inward by pressing on a button 36 which is connected by an arm 38 to the protrusion 34. An extension 38A of the arm 38 extends beyond the protrusion 34 and is connected to the inside of the leg 26. The arm 38 and the extension 38A are constructed of spring steel or other suitable material to urge the protrusion 34 outward, and to permit the protrusion 34 to be manually urged inward by pressing on the button 36.

Each pair of ears 30 includes a first depression 30A which receives the protrusion 34 when the leg 26 is in a folded position, and a second depression 30B which receives the protrusion 34 when the leg 26 is in an unfolded position.

A portion of FIG. 3 is shown in cross-sectional view to show that the first and the second threaded sleeves 22, 24 threadedly engage the second elongated member 12B and the third elongated member 12C respectively when the assembly 12 is in a fully retracted position.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention.

Accordingly, the scope of the invention is to be limited only by the following claims and their legal equivalents.

The invention claimed is:

1. An adjustable stand comprising:
   a. a telescoping assembly;
   b. a base for supporting the assembly above a floor;
   c. the assembly comprising nestable elongated members;
   d. at least one apparatus mounting means attached to a distal end of the assembly;
   e. the elongated members including a first elongated member attached to the base and a second elongated member nestable within the first elongated member;
   f. a threaded sleeve being rotatably attached to a distal end of the first elongated member, the sleeve being restricted from movement longitudinally along the first elongated member; and
   g. the second elongated member having a first threaded portion at a first end to engage the threaded sleeve, and a second threaded portion at a second end to engage the threaded sleeve, the second elongated member being completely unthreaded between the first and second threaded portions, wherein the second elongated member is lockable in a completely nested position and in a completely extended position relative to the first elongated member.

2. The stand of claim 1, wherein at least one of the first and second elongated members includes a plurality of mounting holes there-through, the mounting holes adapted for insertion of an end of a mounting hook therein, for mounting of an apparatus on the mounting hook.

3. The stand of claim 1, wherein the base includes a plurality of legs pivotally attached to a central member, the central member is attached to the telescoping assembly, and each leg is lockable in a folded and an unfolded position.

4. The stand of claim 1, wherein the apparatus mounting means comprises at least one hook extended outwardly from the assembly.

* * * * *